3,336,301
PROCESS AND INTERMEDIATES FOR MANUFACTURE OF 17-SUBSTITUTED 3-KETO-$\Delta^4$ AND 3-KETO-$\Delta^{5(10)}$ STEROIDS
Paul D. Klimstra, Northbrook, Ill., assignor to G. D. Searle & Co., Chicago, Ill., a corporation of Delaware
No Drawing. Filed Oct. 21, 1965, Ser. No. 500,372
11 Claims. (Cl. 260—239.55)

The present invention is concerned with a novel process for the manufacture of 3-keto steroids having an A-ring double bond either in the 4(5) or 5(10) position and with novel intermediates prepared by and utilized in that process. These novel intermediates are represented by the following structural formula

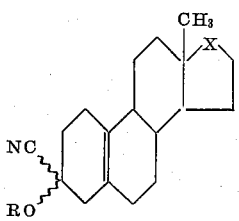

wherein —OR is an hydroxy, esterified or etherified hydroxy radical, X is a carbonyl or $\alpha$-ethynyl-$\beta$-hydroxymethylene radical, and the wavy lines indicate the alternative $\alpha$ or $\beta$ configuration of the substituents at carbon 3.

The instant derivatives containing an esterified hydroxy function at the 3-position are typified by the 3-(lower alkanoyl)oxy compounds, wherein the lower alkanoyl group is exemplified by formyl, acetyl, propionyl, butyryl, valeryl, caproyl, heptanoyl and the branched-chain groups isomeric therewith.

A particularly suitable starting material for utilization in the instant process is ester-5(10)-ene-3,17-dione. When that substance is contacted with hydrogen cyanide itself or with a source thereof, it has surprisingly been found that reaction occurs selectively and exclusively with the 3-keto group to afford the corresponding cyanohydrin, i.e. 3 - cyano - 3 - hydroxyester-5(10)-en-17-one. Sources of hydrogen cyanide useful for this purpose are hydrogen cyanide, either in gaseous or liquid form, alkali metal cyanides such as potassium cyanide or sodium cyanide in combination with a strong acid such as hydrochloric or sulfuric and cyanohydrins of aliphatic carbonyl compounds such as acetone cyanohydrin and cyclohexanone cyanohydrin. In the latter transcyanohydrination procedure an alkaline catalyst is optionally used. Suitable catalysts are organic amines such as triethylamine and inorganic bases such as sodium hydroxide, potassium hydroxide, sodium carbonate, potassium carbonate, etc. As a specific example of this procedure, the aforementioned estr-5(10)-ene-3,17-dione in aqueous methanol is contacted at room temperature with acetone cyanohydrin in the presence of a catalytic quantity of triethylamine to produce 3-cyano-3-hydroxyestr-5(10)-en-17-one.

In the second step of the instant process, the cyanohydrin function is stabilized by conversion of its hydroxy group to an ether or ester function so that the 17-keto group can be further converted. A particularly suitable stabilizing function is the tetrahydropyran-2-yl group. The foregoing 3-cyano-3-hydroxyestr-5(10)-en-17-one is thus contacted at room temperature with dihydropyran in the presence of a catalytic quantity of p-toluenesulfonic acid to yield 3-cyano-3-tetrahydropyran-2-yloxyestr-5(10)-en-17-one. Other stabilized ether derivatives are obtained by the reaction of that cyanohydrin with aliphatic olefinic compounds such as isobutylene and cyclic olefinic ethers such as dihydrofuran. Alternatively, the cyanohydrin produced in the initial step of the instant process is contacted with a lower alkanoic acid anhydride or halide, optionally in the presence of a suitable acid acceptor, to afford the corresponding 3-cyano-3-(lower alkanoyl)oxy derivatives. When acetic anhydride and pyridine, for example, are contacted with 3-cyano-3-hydroxyestr-5(10)-en-17-one at room temperature, there is obtained 3-acetoxy-3-cyanoestr-5(10)-en-17-one.

The aforementioned cyanohydrin intermediates wherein the hydroxy group has been converted to an ether function are particularly suitable when further conversion of the 17-keto group involves alkaline conditions. 3-cyano-3-tetrahydropyran-2-yloxyestr-5(10)-en-17-one is thus allowed to react with lithium acetylide in the form of its ethylene diamine complex to produce 3-cyano-17$\alpha$-ethynylestr-5(10)-ene-3,17$\beta$-diol 3 - tetrahydropyran-2-yl ether. When the reaction at the 17-position involves reaction conditions at or near neutrality, the 3-(lower alkanoyl)oxy-3-cyano intermediates can be used. 3-acetoxy-3-cyanoestr-5(10)-en-17-one thus is contacted with lithium tri-(tertiary-butoxy) aluminum hydride in tetrahydrofuran to yield 3-cyanoestr-5(10)-ene-3,17$\beta$-diol 3-acetate.

Removal of the protective cyanohydrin function from the intermediates of the present invention is effected, in the case of the etherified derivatives, by first heating with an acidic reagent to remove the ether function, then heating with an alkaline reagent to cleave the cyanohydrin moiety. As a specific example, the aforementioned 3-cyano-17$\alpha$-ethynylestr - 5(10)-ene-3,17$\beta$-diol 3-tetrahydropyran-2-yl ether in methanol is heated with p-toluenesulfonic acid to afford 3-cyano-17$\alpha$-ethynylestr-5(10)-ene-3,17$\beta$-diol, and the latter diol is heated with triethylamine in aqueous acetone to produce 17$\alpha$-ethynyl-17$\beta$-hydroxyestr-5(10)-en-3-one, a known progestational agent. The esterified cyanohydrin intermediates are cleaved by reaction with an alkaline reagent such as triethylamine, pyridine, sodium hydroxide, potassium hydroxide, sodium methoxide, sodium carbonate, potassium carbonate, etc. In that manner, 3-cyanoestr-5(10)-ene-3,17$\beta$-diol 3-acetate is contacted with pyridine to afford 17$\beta$-hydroxyestr-5(10)-en-3-one. Use of a more alkaline reagent such as sodium methoxide results in concomitant rearrangement of the $\Delta^{5(10)}$ double bond, thus affording 17$\beta$-hydroxy-estr-4-en-3-one, a known pharmacological agent particularly useful in view of its anabolic activity.

The cyanohydrin formed in the initial step of the instant process is obtained as a mixture of the two possible stereoisomeric forms. The individual isomers are thus characterized as 3$\alpha$-cyano-3$\beta$-hydroxy and 3$\beta$-cyano-3$\alpha$-hydroxy. It is apparent that the esterified and etherified derivatives and those derivatives functionally converted at the 17-position which are obtained in the succeeding steps of this process are likewise obtained as stereoisomeric mixtures.

The invention will appear more fully from the examples which follow: These examples are given by way of illustration only, however, and are not to be construed as limiting the invention either in spirit or in scope as many modifications both in materials and methods will be apparent from this disclosure to those skilled in the art. In these examples temperatures are given in degrees centigrade (° C.) and quantities of materials in parts by weight unless otherwise noted.

EXAMPLE 1

A mixture of 25 parts of estr-5(10)-ene-3,17-dione, 84 parts of methanol and 0.5 part of triethylamine is heated until homogeneous, at which time 23.3 parts of acetone cyanohydrin is added. Upon addition of approximately 10 parts of water the reaction mixture changes to a solid mass. Cooling of that mass at 0-5° for a short time followed by filtration affords the crude product, which is washed with methanol and dried in air. Purification by recrystallization from ethyl acetate or from methanol results in 3-cyano-3-hydroxyestr-5(10)-en-17-one, melting at about 215–218° with decomposition, and represented by the following structural formula

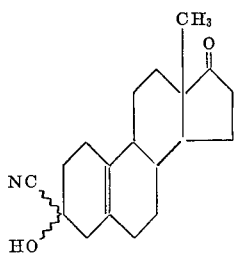

EXAMPLE 2

To a slurry of 10 parts of 3-cyano-3-hydroxyestr-5(10)-en-17-one, 12 parts of dihydropyran and 107 parts of methylene chloride is added 0.01 part of p-toluenesulfonic acid monohydrate, and the resulting mixture is allowed to stand at room temperature for about 44 hours. At the end of that time, the reaction mixture which has become homogeneous is extracted with ether, and the ether layer is separated, washed successively with 5% aqueous sodium bicarbonate and water, then dried over anhydrous sodium sulfate containing decolorizing carbon and stripped of solvent by distillation under reduced pressure. The initially obtained orange oily residue gradually crystallizes upon standing, and the resulting crystals are washed with hexane, then recrystallized from ethyl acetate containing hexane to afford pure 3-cyano-3-tetrahydropyran-2-yloxy-estr-5(10)-en-17-one, melting at about 141.5–143.5°. This compound is represented by the following structural formula

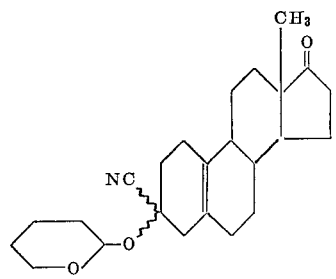

EXAMPLE 3

To a solution of 5 parts of the 30% lithium acetylide-70% ethylene diamine complex in 22.5 parts of tetrahydrofuran is added, with stirring, a solution of one part of 3-cyano-3 - tetrahydropyran-2-yloxyestr - 5(10)-en-17-one in 22.5 parts of tetrahydrofuran. The resulting solution is stirred at room temperature for about 4 hours, then is diluted with water. The resulting aqueous mixture is extracted with ether, and the ether layer is separated, then washed with water, dried over anhydrous sodium sulfate containing decolorizing carbon and distilled to dryness under reduced pressure to afford, as a yellow oil, 3-cyano-17α-ethynylestr - 5(10)-ene-3,17β-diol 3-tetrahydropyran-2-yl ether, characterized by infrared absorption maxima, in chloroform, at about 2.75, 3.03, 3.40, 8.95, 9.42 and 9.67 microns. It is represented by the following structural formula

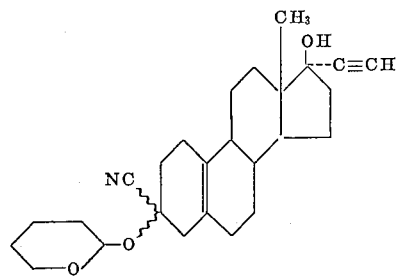

EXAMPLE 4

A mixture containing one part of 3-cyano-17α-ethynyl-ester-5(10) - ene-3,17β-diol 3-tetrahydropyran-2-yl ether, 0.3 part of p-toluenesulfonic acid monohydrate and 60 parts of methanol is heated at the reflux temperature for about 30 minutes, then is diluted with water and cooled to room temperature. The resulting precipitate is collected, washed on the filter with water and dried to afford 3-cyano-17α-ethynylestr-5(10)-ene-3,17β-diol, which displays, in chloroform, infrared absorption maxima at about 2.77, 3.03 and 3.41 microns. It is characterized further by the following structural formula

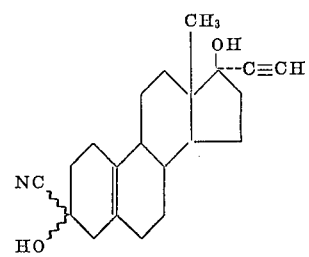

EXAMPLE 5

To a solution of 6 parts of 3-cyano-17α-ethynylestr-5(10)-ene-3,17β-diol in 24 parts of acetone is added successively 51 parts of triethylamine and 10 parts of water, and the resulting reaction mixture is heated at the reflux temperature for about 5 minutes. Concentration of that mixture to dryness under reduced pressure affords 17α-ethynyl-17β-hydroxyestr-5(10)-en-3-one, which exhibits, in chloroform, infrared absorption maxima at about 2.76, 3.03, 3.41 and 5.82 microns.

EXAMPLE 6

A mixture containing 2 parts of 3-cyano-3-hydroxyestr-5(10)-en-17-one, 20 parts of pyridine and 10 parts of acetic anhydride is allowed to stand at room temperature for about 40 hours, then is poured carefully into a mixture of ice and water. The oily layer which forms is isolated by decantation, then is dissolved in ether. The ether solution is washed successively with water, dilute hydrochloric acid and 5% aqueous sodium bicarbonate, then dried over anhydrous sodium sulfate containing decolorizing carbon. Distillation of the solvent under reduced pressure affords, as an oily glass-like material, 3-acetoxy-3-cyanoestr-5(10)-en-17-one. This compound exhibits, in chloroform, infrared absorption maxima at about 3.41, 5.70–5.74, 7.29, 8.03 and 9.72 microns and is further characterized by the following structural formula

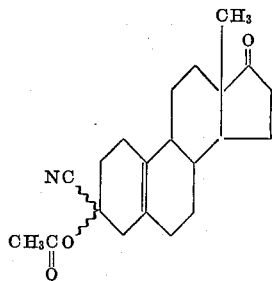

EXAMPLE 7

When an equivalent quantity of propionic anhydride is substituted in the procedure of Example 6, there is obtained 3-cyano-3-propionoxyestr-5(10)-en-17-one.

What is claimed is:

1. The process which comprises contacting estr-5(10)-ene-3,17-dione with a source of hydrogen cyanide to afford 3-cyano-3-hydroxyestr-5(10)-en-17-one.
2. The process which comprises contacting estr-5(10)-ene-3,17-dione with acetone cyanohydrin in the presence of basic catalyst to afford 3-cyano-3-hydroxyestr-5(10)-en-17-one.
3. The process which comprises contacting estr-5(10)-ene-3,17-dione with acetone cyanohydrin in the presence of triethylamine to afford 3-cyano-3-hydroxyestr-5(10)-en-17-one.
4. The process which comprises contacting estr-5(10)-ene-3,17-dione with a source of hydrogen cyanide, contacting the resulting 3-cyano-3-hydroxyestr-5(10)-en-17-one with dihydropyran, contacting the resulting 3-cyano-3-tetrahydropyran-2-yloxyestr-5(10)-en-17-one with a source of acetylene, contacting the resulting 3-cyano-17α-ethynylestr-5(10)-ene-3,17β-diol 3-tetrahydropyran-2-yl ether with an acidic reagent and contacting the resulting 3-cyano-17α-ethynylestr-5(10)-ene-3,17β-diol with an alkaline reagent to afford 17α-ethynyl-17β-hydroxyestr-5(10)-en-3-one.

5. A compound of the formula

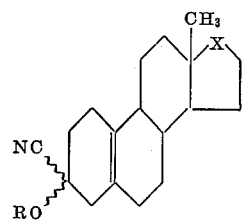

wherein R is a member of the class consisting of hydrogen, a lower alkanoyl and a tetrahydropyran-2-yl radical and X is selected from the group consisting of a carbonyl and an α-ethynyl-β-hydroxymethylene radical.

6. A compound of the formula

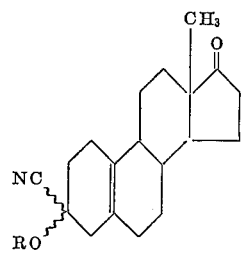

wherein R is a member of the class consisting of hydrogen, a lower alkanoyl and a tetrahydropyran-2-yl radical.

7. 3-cyano-3-hydroxyestr-5(10)-en-17-one.
8. 3-cyano-3 - tetrahydropyran - 2-yloxyestr-5(10)-en-17-one.
9. 3-acetoxy-3-cyanoestr-5(10)-en-17-one.
10. 3-cyano - 17α - ethynylestr-5(10)-ene-3,17β-diol 3-tetrahydropyran-2-yl ether.
11. 3-cyano-17α-ethynylestr-5(10)-ene-3,17β-diol.

References Cited

Gardi et al.: Gazz. Chim. It., 91, 1250–1257 (1961).
Ueberwasser et al.: Helv. Chim. Act. 46, 344–352 (1963).

LEWIS GOTTS, *Primary Examiner.*

ELBERT L. ROBERTS, *Examiner.*

THOMAS M. MESHBESHER, *Assistant Examiner.*